UNITED STATES PATENT OFFICE.

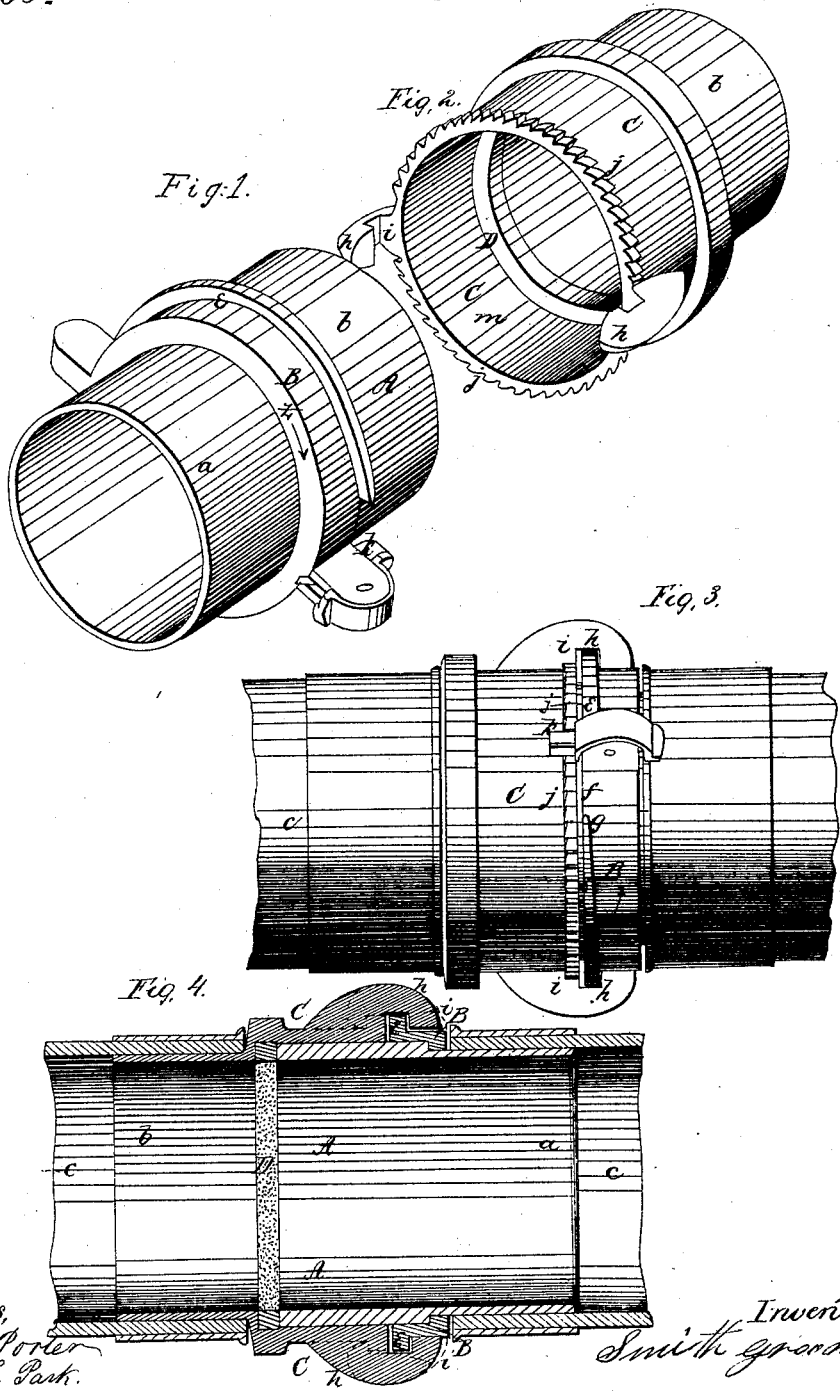

SMITH GROOM, OF TROY, NEW YORK.

HOSE-COUPLING.

Specification of Letters Patent No. 23,368, dated March 29, 1859.

*To all whom it may concern:*

Be it known that I, SMITH GROOM, of the city of Troy, in the county of Rensselaer and State of New York, have invented an Improved Coupling for Uniting the Lengths of Firemen's Hose and other Pipes; and I do hereby declare that the following is a full and exact description thereof, reference being had to the annexed drawings, making a part of this specification, in which—

Figure 1 is a perspective view of the male half of the coupling, and Fig. 2 of the female part; and Fig. 3 is a plan, and Fig. 4 a longitudinal section of the two halves of the coupling united, with ends of hose attached.

The same letters refer to like parts in all the figures.

The male part of the coupling consists of the tubular cylindrical casting, A, and the ring B, which can be turned upon it; and the female part is composed of the hollow cylindrical casting C, and the packing, D, within it;—each part, A and C, being extended back of the ring and packing respectively, as at $a$, and $b$, and attached there, to the pipe or hose, $c$, $c$, in the usual manner. The male part, A, is of such size that it may be freely slid into, and turned within, the female part C. Wedge-like flanges, E, E, are arranged around and upon the ring B; and there is a vacant space, $f$, at the narrow end, $g$, of each flange, large enough for a lug $h$, $h$, to pass through;—the said lugs being arranged upon the outside of the front part of the female portion of the coupling, and at the same distances apart as the spaces $f$, so that when the male part is slid into the female portion the lugs are passed through the spaces. Each lug has a notch, $i$, on its inner side, so that when the male part is inserted in the female portion and the ring is then turned in the direction pointed by the arrow $z$, the wedge-like flanges E, E, enter the notches, and thereby force the male part of the coupling down upon the packing, as shown in Fig. 4, so as to make a tight joint there. To separate the two halves, the ring is turned in the opposite direction.

Instead of having but two wedge-like flanges E and two hooked lugs, $h$, as shown in the drawings, three or more of each may be employed; and instead of having all the flanges on the ring, and all the lugs on the female part, one or more of the lugs may be on the ring and an equal number of flanges on the female part, as indicated by red lines in Fig. 4.

By having the wedge-shaped flanges, E, E, and notched lugs, $h$, $h$, arranged upon the outside of the movable ring, B, and fixed part C, for conjoint operation as above described, there is a combination of advantages thereby secured, of much practical value. For this coupling makes a packed joint which is increased in tightness according to the increase of power applied in turning up the ring of the coupling; and the lengths of hose or pipe are not required to be twisted in being united thereby; so that in these respects it is not inferior to the common screw coupling in general use; and a fireman can connect or disconnect lengths of hose by my improved coupling in a small part of the time required to unite or separate the lengths by the screw coupling. Also in my coupling the inner surface, $m$, of the female part, and the outer one, $l$, of the male part, are without any such grooves or recesses, in which dirt can lodge and water freeze so as to make it difficult or impossible to work the coupling, as there necessarily are in the common screw-and-nut coupling, and in several locking couplings heretofore made with the wedge-shaped flanges and lugs, or analogous parts, within the outer case of the coupling. Also, in my improved coupling, all the parts which serve to hold the two halves thereof together, are exposed to view, and are accessible, both when the two halves are united, and when they are separate; so that the fireman can see at a glace, or instantly feel, how to put the coupling together, and immediately discover any ordinary obstruction, and remove it at once.

Rows of ratchet teeth, $j$, $j$, are arranged on one half of the coupling, and a movable catch, $k$, on the other half, so that when the two halves of the coupling are united, the catch may then be engaged with the ratchet teeth, and prevent the coupling from working loose so as to leak when employed to connect lengths of the suction-hose of fire-engines and other pipes which are liable to become disconnected in use.

I do not claim as my invention the arrangement of notched lugs and wedge-shaped flanges upon the collars of hose in the manner shown in No. 9768 of United States patents; nor the arrangement of wedge-shaped flanges upon the outside of the female part, and inside of the movable ring or nut, of the two halves of the coupling as represented in the rejected application of B. F. Joslyn, May 14, 1857.

Having thus set forth the construction and use of my improved hose-coupling, what I claim thereof as new and desire to secure by Letters Patent is, 1. The arrangement of the notched lugs, $h$, $h$, and wedge-shaped flanges, E, E, for conjoint operation, upon the outside of the fixed part, C, and movable ring, B, of the two halves of the coupling, as, and for the purpose herein described.

2. And in combination with the lugs, $h$, $h$, and flanges, E, E, constructed and arranged upon the coupling for conjoint operation as herein described, I also claim the ratchet-teeth, $j$, and catch, $k$, when arranged upon the two halves of the coupling as herein described, for the purpose specified.

SMITH GROOM.

Witnesses:
 JNO. F. PORTER,
 AUSTIN F. PARK.